United States Patent
El et al.

(10) Patent No.: US 12,417,659 B2
(45) Date of Patent: Sep. 16, 2025

(54) METHOD OF ACQUIRING AND PROCESSING AUTONOMOUS AERIAL VEHICLE DATA

(71) Applicant: Shearwater Aerospace Inc., Montreal (CA)

(72) Inventors: Tin Fares El, Montreal (CA); Christian Alexander Patience, Mont-Royal (CA); Meyer Nahon, Montreal (CA); Inna Sharf, Montreal (CA); Farhad Rahbarnia, Monteal (CA); Alexandre Borowczyk, Montreal (CA)

( * ) Notice: Subject to any disclaimer, the term of this patent is extended or adjusted under 35 U.S.C. 154(b) by 0 days.

(21) Appl. No.: 18/548,169

(22) PCT Filed: Feb. 25, 2022

(86) PCT No.: PCT/CA2022/050271
§ 371 (c)(1),
(2) Date: Aug. 28, 2023

(87) PCT Pub. No.: WO2022/178641
PCT Pub. Date: Sep. 1, 2022

(65) Prior Publication Data
US 2024/0161557 A1    May 16, 2024

Related U.S. Application Data

(60) Provisional application No. 63/154,427, filed on Feb. 26, 2021.

(51) Int. Cl.
G07C 5/08  (2006.01)
G07C 5/00  (2006.01)
(Continued)

(52) U.S. Cl.
CPC .......... *G07C 5/0816* (2013.01); *G07C 5/008* (2013.01); *G08G 5/20* (2025.01); *G08G 5/55* (2025.01); *G08G 5/57* (2025.01); *B64U 2201/10* (2023.01)

(58) Field of Classification Search
CPC ........ G07C 5/0816; G07C 5/008; G08G 5/20; G08G 5/55; G08G 5/57; B64U 2201/10;
(Continued)

(56) References Cited

U.S. PATENT DOCUMENTS 10,163,357 B2 * 12/2018 Venkatraman ........... G08G 5/59
2018/0061251 A1 *  3/2018 Venkatraman ......... G01C 21/20

FOREIGN PATENT DOCUMENTS

CN   112881993   *  6/2021
EP     3121676   *  1/2017

OTHER PUBLICATIONS

Andrew Gong and Dries Verstraete. 2015. "Development of a Dynamic Propulsion Model for Electric UAVs." Asia-Pacific International Symposium on Aerospace Technology.
(Continued)

*Primary Examiner* — Muhammad Shafi
(74) *Attorney, Agent, or Firm* — Michael Downs; Downs IP Law LLC

(57) ABSTRACT

A computer implemented method of acquiring and processing autonomous aerial vehicle data comprising obtaining past flight data from an autonomous aerial vehicle; storing the data in a database; conducting netto-variometer calculations to obtain equations to normalize the data; using a filtering technique to normalize the data; storing the equations obtained from the netto-variometer calculations into the database; and using the stored equations and live flight data to generate an optimized sink polar estimate for the autonomous aerial vehicle, wherein the optimized sink polar
(Continued)

estimate is to be used in computing netto-variometer during flight.

16 Claims, 10 Drawing Sheets

(51) Int. Cl.
    *G08G 5/20*     (2025.01)
    *G08G 5/55*     (2025.01)
    *G08G 5/57*     (2025.01)

(58) Field of Classification Search
    CPC ..... B64U 2201/00; G01P 3/62; G01P 21/025; G01P 13/025; B64C 31/02; B64F 5/00
    USPC .......................................................... 701/3
    See application file for complete search history.

(56) References Cited

OTHER PUBLICATIONS

Andrew Gong and Dries Verstraete. 2015. "Extending Range and Endurance Estimates of Battery Powered Electric Aircraft." 16th Australian Aerospace Congress Feb. 23-24, 2015, Melbourne.

Beeler, Scott C. 2003. "A Flight Dynamics Model for a Small Glider in Ambient Winds." National Aeronautics and Space Administration.

Bencatel, Ricardo. 2011. "Perpetual Flight in Flow Fields.".

Bergmann, Dominique Paul, Jan Denzel, Ole Pfeifle, Stefan Notter, Walter Fichter, and Andreas Strohmayer. 2021 "In-Flight Lift and Drag Estimation of an Unmanned Propeller-Driven Aircraft." Aerospace.

Darren Lee et al. 2012. "Predictive Control for Soaring of Unpowered Autonomous UAVs." 4th IFAC Nonlinear Model Predictive Control Conference.

Edwards, Dan. 2007. "Performance Testing of RNR's SBXC Using a Piccolo Autopilot.".

Edwards, Daniel J., Aaron D. Kahn, and Blake Poe. 2019. "Autonomous Soaring across Three Orders of Magnitude of Mass." Naval Research Lab.

Gong, Andrew, and Dries Verstraete. 2017. "Experimental Testing of Electronic Speed Controllers for UAVs." In 53rd AIAA/SAE/ASEE Joint Propulsion Conference. Reston, Virginia: American Institute of Aeronautics and Astronautics.

Gong, Andrew, Hugh Maunder, and Dries Verstraete. 2017. "Development of an In-Flight Thrust Measurement System for UAVs." In 53rd AIAA/SAE/ASEE Joint Propulsion Conference. Reston, Virginia: American Institute of Aeronautics and Astronautics.

Gong, Andrew, Rens MacNeill, and Dries Verstraete. 2018. "Performance Testing and Modeling of a Brushless DC Motor, Electronic Speed Controller and Propeller for a Small UAV Application." In 2018 Joint Propulsion Conference. AIAA Propulsion and Energy Forum. American Institute of Aeronautics and Astronautics.

Kumar, N., S. Saderla, and Y. Kim. 2023. "System Identification of Cropped Delta UAVs from Flight Test Methods Using Particle Swarm-Optimisation-Based Estimation." The Aeronautical Journal 127 (1307): 76-96.

Langelaan, Jack W. 2016. "Power Generation and Energy Management." Encyclopedia of Aerospace Engineering, 1-20.

Lecarpentier, Erwan, Sebastian Rapp, Marc Melo, and Emmanuel Rachelson. 2017 "Empirical Evaluation of a Q-Learning Algorithm for Model-Free Autonomous Soaring." JFPDA.

Lundström, David, Kristian Amadori, and Petter Krus. 2010. "Validation of Models for Small Scale Electric Propulsion Systems." In 48th AIAA Aerospace Sciences Meeting Including the New Horizons Forum and Aerospace Exposition. Reston, Virgina: American Institute of Aeronautics and Astronautics.

Macneill, Rens, Dries Verstraete, and Andrew Gong. 2017. "Optimisation of Propellers for UAV Powertrains." In 53rd AIAA/SAE/ASEE Joint Propulsion Conference. Reston, Virginia: American Institute of Aeronautics and Astronautics.

Murnane, Martin, and Adel Ghazel. 2017. "A Closer Look at State of Charge (SOC) and State of Health (SOH) Estimation Techniques for Batteries." Analog Devices 2: 426-36.

Nayak, Deekshitha S., and R. Shivarudraswamy. 2022. "Loss and Efficiency Analysis of BLDC Motor and Universal Motor by Mathematical Modelling in the Mixer Grinder." Journal of The Institution of Engineers (India): Series B 103 (2): 517-23.

Nita, M. and Scholz, D. 2012. "Estimating the Oswald Factor from Basic Aircraft Geometrical Parameters.".

Norris, Jack, and Andrew B. Bauerf. 1993. "Zero-Thrust Glide Testing for Drag and Propulsive Efficiency of Propeller Aircraft." Journal of Aircraft.

Park, Seongyun, Jeongho Ahn, Taewoo Kang, Sungbeak Park, Youngmi Kim, Inho Cho, and Jonghoon Kim. 2020. "Review of State-of-the-Art Battery State Estimation Technologies for Battery Management Systems of Stationary Energy Storage Systems." Journal of Power Electronics 20 (6): 1526-40.

Tabor Samuel et al. "ArduSoar : An Open-Source Thermalling Controller for Resource-Constrained Autopilots", 2018 IEEE/RSJ International Confernce On Intelligent Robots and Systems (IROS), IEEE, Oct. 1, 2018.

Tin Fares El et al. "Exploitation of Thermals in Powered and Unpowered Flight of Autonomous Gliders"—2021 International Conference On Unmanned Aircraft Systems (IUCAS), IEEE, Jun. 15, 2021.

Tin Fares El et al. "Turn Decision-Making for Improved Autonomous Thermalling of Unmanned Aerial Gliders", 2020 International Conference On Unmanned Aircraft Systems (ICUAS), IEEE Sep. 1, 2020.

Tin Fares El et al. "Turn Decision-Making for Improved Autonomous Thermalling of Unmanned Aerial Gliders", Journal of Intelligent and Robotic Systems, Springer Netherlands, Dordrechtm Vik, 194 No. 2.

Traub, Lance W. 2022. "Calculation of the Oswald Efficiency Factor from Drag Polars: A Critical Assessment." Journal of Aircraft 59 (6): 1608-15.

Wing-Ho, Frank. 1997. "Enhancements to SIMMOD: A Neural Network Post-Processor to Estimate Aircraft Fuel Consumption."

\* cited by examiner

Fig. 5: Netto-variometer data from the simulation. Actual netto data is in black, while netto measusrements without accounting for the thrust is the dashed blue line. The ground truth is shown in red. The regions of flight are as detailed in Figure 4.

METHOD OF ACQUIRING AND PROCESSING AUTONOMOUS AERIAL VEHICLE DATA

TECHNICAL FIELD

The following relates to autonomous aerial vehicles such as drones. More specifically, this patent relates to methods of acquiring and processing data collected by autonomous aerial vehicles.

BACKGROUND

Autonomous sensing vehicles (ASV) such as drones or unmanned aerial vehicles (UAV), and unmanned aerial gliders (UAG) are vehicles that are typically unoccupied, usually highly maneuverable, and can be operated remotely by a user proximate to the vehicle or can be operated autonomously. Autonomously operated vehicles do not require a user to operate them. Autonomous vehicles may have the potential to greatly improve both the range and endurance of unmanned vehicles. Autonomous sensing vehicles may be used for a number of uses including, but not limited to remote sensing, commercial surveillance, filmmaking, disaster relief, geological exploration, agriculture, rescue operations, and the like. It can be noted that it would be ideal to increase the operation time and endurance of ASV's for these and other uses. Autonomous sensing vehicles may contain a plethora of sensors which can include, but are not limited to accelerometers, altimeters, barometers, gyroscope, thermal cameras, cameras, LiDAR (Light Detection and Ranging) sensors, etc. These sensors may be useful for increasing the operation time and endurance of ASV or may be useful for the uses mentioned above. For instance, a gyroscope can be used for measuring or maintaining orientation and angular velocity of the ASV and may improve the operational time of the ASV; however, a camera may be used to take images during geological exploration.

In order to detect the presence of thermal updraft (region of upward moving air), an accurate characterization of the sink characteristics of the UAG (unmanned aerial glider) may be required. A sink polar describes the sink behavior of an aircraft in calm (windless) conditions, as a function of airspeed. The sink polar is a powerful tool that provides us with the speed-to-fly for minimum sink to prolong flight time as well as the best glide angle for maximum range. During flight, the sink polar is used to obtain the expected sink of the UAG at its current airspeed and compare it to the actual sink or climb rate of the aircraft in order to estimate the velocity of the surrounding airmass.

Generally, to obtain the sink polar of an UAG, several flight tests are performed in calm conditions, at varying airspeed, in order to characterize the performance of the UAG. However, this complicates the implementation of autonomous soaring algorithms on an off-the-shelf platform since it requires multiple precursory flights and post-flight analysis of the data to produce a sink polar. Therefore, most prior art, rely on using the same UAG for research purposes to avoid the sink polar analysis associated with a new platform.

SUMMARY

A computer implemented method of acquiring and processing autonomous aerial vehicle data comprising: past flight data from an autonomous aerial vehicle; storing the offline data in a database; conducting netto-variometer calculations to obtain equations to normalize the data; using a filtering technique to normalize the data; storing the equations obtained from the netto-variometer calculations into the database; and using the stored equations to normalize live flight data.

The autonomous aerial vehicle data are collected using sensors comprising at least one of sink polar data, GPS data, Barometer data, aircraft speed, motor RPM, and propeller characteristics. The live flight data uses data acquired from the sensors.

A system for acquiring and processing autonomous aerial vehicle data comprising: an aerial vehicle; a computer comprising a database and a processing unit located on the aerial vehicle; a plurality of sensors for acquiring autonomous aerial vehicle data; wherein the processing unit is responsible for energy calculations, thrust calculation, netto-variometer calculations; and thermal decision calculations.

The plurality of sensors comprises at least one of: sink polar data, GPS data, Barometer data, aircraft speed, motor RPM, and propeller characteristics.

BRIEF DESCRIPTION OF THE DRAWINGS

Embodiments will now be described with reference to the appended drawings wherein.

DETAILED DESCRIPTION

Figure 1:
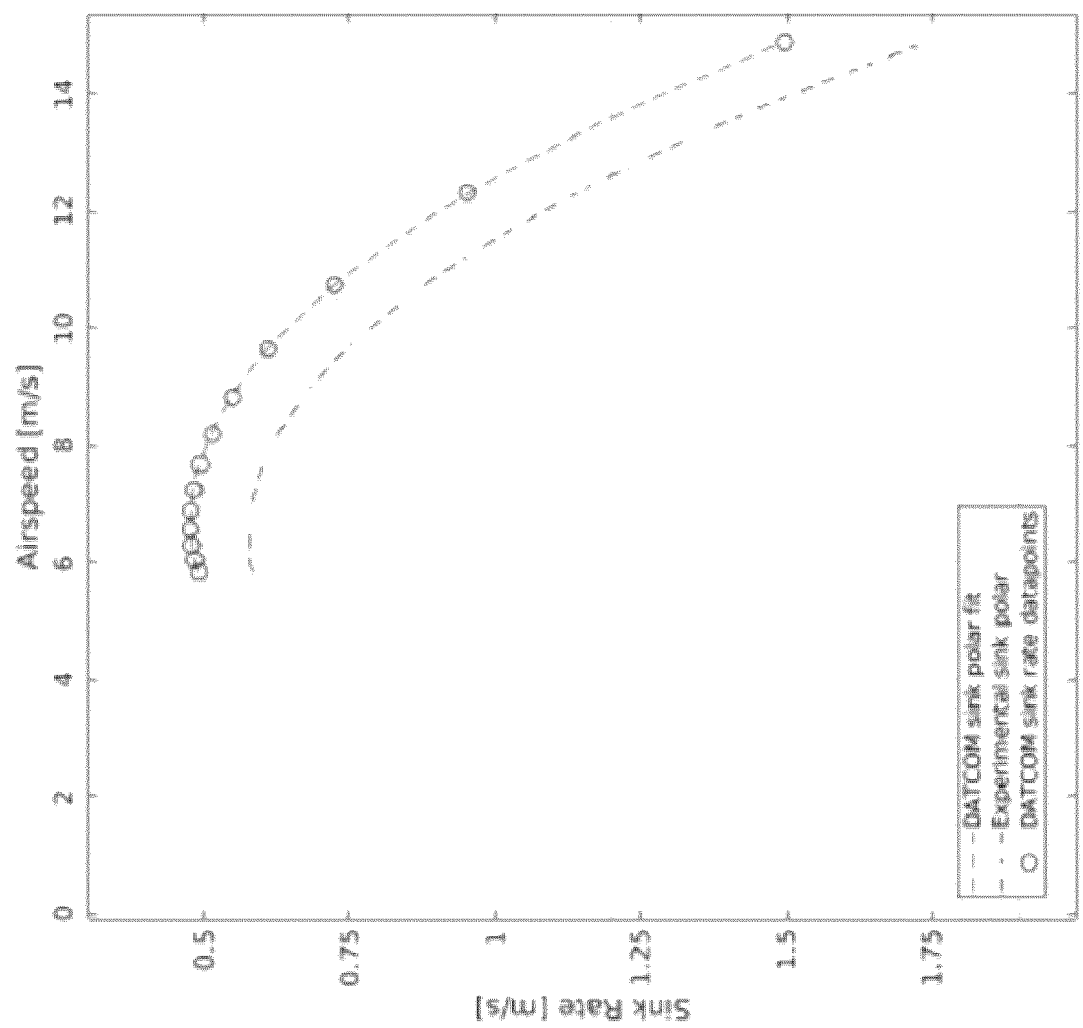
FIG. 1 is a chart of a Remote Control glider sink polar.

Fixed-wing Unmanned Aerial Vehicles (UAVs) provide several advantages over multi-rotor UAVs, such as long range and increased flight time, which makes them ideal for surveillance and delivery missions. A subclass of fixed-wing UAVs consists of Unmanned Aerial UAGs (UAGs), designed with a long wingspan and large aspect ratio for the purposes of extracting the most of available atmospheric energy, to extend flight time and range. A typical UAG is shown in FIG. 1. FIG. 1 provides the Magellan RC glider sink polar. The most common form of atmospheric energy is in the form of thermal updraft and is therefore the focus of most research on autonomous UAG operation. Significant gains in flight time have been shown in early flight tests with autonomous soaring.

Several researchers have studied autonomous UAGs in an effort to develop algorithms for detecting and exploiting thermal updrafts. The standard method for detecting the presence of updrafts consists of monitoring the change in energy of the vehicle during flight, to produce variometer measurements, which reflect the rate of climb or descent. Further, by deducting the expected natural sink of the UAG in still air, netto-variometer measurements can be obtained, which are equivalent to the velocity of the local air-mass in the Up/Down axis.

Following detection of thermal updraft, a variety of methods have been proposed to estimate the point of maximum updraft within the region, or the center of the thermal assuming a Gaussian distribution of the updraft. The most common of these methods is the centroid method, which is comparable to computing the centroid of a 2D shape. The algorithm functions as follows: Upon detection of potential thermal updraft, the UAG enters orbital flight. A batch of position data is collected and weighed with netto-variometer measurements and a centroid is computed, which becomes the new orbital center for the UAG. An algorithm was proposed that implements a Least-Squares estimation of the thermal properties, such as the radius and the maximum updraft velocity, combined with the centroid method, to obtain all the required data to allow for autonomous thermalling.

Integrating previous works on autonomous thermalling, several researchers have investigated complete autonomous soaring and path planning solutions, which combine detection and thermalling with exploration and mapping. A wind map is generated from observed wind data while gliding, using Gaussian process regression, in a static wind field, which allowed the UAG to simultaneously explore a given region and exploit available thermals, based on the system's energy level. In more recent work, an autonomous soaring system is developed combining real-time mapping with thermalling. The algorithm works by using a priori information on the characteristics of the region of flight, generates a dynamic map of thermal updrafts that accounts for decay over time, and decides whether to exploit a thermal or further explore the region.

While prior work has established the capabilities of UAGs to autonomously locate and exploit thermals, they were focused on detecting and utilizing thermals when in gliding flight, in order to gain altitude and thus increase overall flight time. However, this limits the opportunities to utilize available thermal updraft during powered flight or on other powered fixed-wing UAVs which can still capitalize on available updraft to preserve on-board battery power.

The main contribution of this work is the implementation of an algorithm which accounts for segments of powered flight by modifying netto-variometer measurements during flight. This allows the aircraft to latch onto available thermal updrafts during a standard mission and maximize flight time. However, in order to do so, the on-board propeller will need to be characterized to produce estimates of the energy added to the system by the motor. Furthermore, in order to improve the overall accuracy of netto-variometer measurements, flight data is filtered using a two pass filter approach, with an Extended Kalman Filter (EKF) forward pass, and a Rauch-Tung-Streibel (RTS) backward pass smoother. This approach allows us to generate a better sink polar estimate for the UAG, to be used in computing netto-variometer during flight. As an addendum to this approach, the sink polar is also estimated using a software that manages the stability and control of the UAV (example USAF Stability and Control DATCOM) to perform aerodynamic analysis on the UAG and produce stability and control derivatives that can be used in the sink polar estimation process. This sink polar is used for preliminary flights with autonomous soaring algorithms and as a basis for subsequent sink polar estimates obtained through flight experiments.

In order to detect the presence of thermal updraft (region of upward moving air), an accurate characterization of the sink characteristics of the UAG is required. A sink polar describes the sink behavior of an aircraft in calm (windless) conditions, as a function of airspeed. The sink polar is a powerful tool that provides us with the speed-to-fly for minimum sink to prolong flight time as well as the best glide angle for maximum range. During flight, an analytical sink polar is used to obtain the expected sink of the UAG at its current airspeed, which is used in to estimate the Up/Down velocity of the surrounding airmass.

Generally, to obtain the sink polar of an UAG, several flight tests are performed in calm conditions, at varying airspeed, in order to characterize the performance of the UAG. However, this complicates the implementation of autonomous soaring algorithms on an off-the-shelf platform since it requires multiple precursory flights and post-flight analysis of the data to produce a sink polar. Therefore, most previous works relied on using the same UAG for research purposes to avoid the sink polar analysis associated with a new platform.

To simplify initial implementation of soaring algorithms, an initial estimate of the sink polar is obtained from aerodynamic analysis through the USAF Stability and Control DAT-COM to calculate stability and control derivatives. This sink polar is used for preliminary flights with autonomous soaring algorithms and as a basis for subsequent sink polar estimates obtained through flight experiments. Furthermore, in order to improve sink polar estimation through collected flight data, on-board EKF state estimation is combined with post-flight off-board filtering using the Rauch-Tung-Streibel (RTS) smoother, to reduce the errors in state estimation, and ultimately produce a more accurate sink polar.

Digital DATCOM analysis is performed on the UAV based on the geometry of the UAG and several flight conditions to produce aerodynamic data throughout the flight envelope. Using the aerodynamic coefficients obtained, sink rate data is generated using (1):

$$v_s = V_a \sin \gamma$$
$$\text{where } \gamma = \arctan \frac{C_D}{C_L}$$

Here, $\gamma$ is the flight path angle of the UAG at given coefficients of drag and lift, $C_D$ and $C_L$, respectively. The UAV airspeed, $V_a$, at those flight conditions is calculated with (2):

$$V_a = \sqrt{\frac{2 \text{ mg } \cos\gamma}{\rho S C_L}}$$

Here, m is the UAG mass, g is the acceleration due to gravity, $\rho$ is the air density, and S is the planform surface area of the wings. The sink polar is generated with a DATCOM analysis (FIG. 1).

RTS smoothing is a two-pass filtering method based on maximum likelihood estimation, which uses all of the sensor data to produce the least uncertain state estimates. The forward pass phase of the RTS is an EKF, which uses available sensor measurements with a process model to estimate the UAG state matrix, which includes attitude quaternions, velocity, position, and wind variables. The standard EKF process consists of $$\check{x}_k = A_{k-1}\hat{x}_{k-1} + B_{k-1}u_{k-1}$$

$$\check{P}_k = A_{k-1}\hat{P}_{k-1}A_{k-1}^T + Q_{k-1}$$

$$K_{k,k}\check{P}_k C_k^T (C_k \check{P}_k C_k^T + R_k)^{-1}$$

$$\hat{x}_k = \check{x}_k + K_{k,k}(y_k - C_k \check{x}_k)$$

$$\hat{P}_k = \check{P}_k - K_k C_k \check{P}_k$$

Here k=0, 1, ..., N samples, $\hat{x}$ and $\check{x}$ are the predicted and corrected state vectors, respectively, u is the control input matrix, A, B, and C are the state transition, control input, and observation matrices, respectively, $\hat{P}$ and $\check{P}$ are the predicted and corrected covariance matrices, respectively, K is the Kalman gain matrix, and Q and R are the process and measurement noise covariance matrices, respectively.

Since the EKF is part of the flight control and estimation process running on-board the flight controller, all of the state and covariance matrices associated with the EKF are logged for post-flight processing.

After performing gliding flights with the UAG flying at a range of airspeeds in calm conditions, data from the EKF estimation process is used offline in the backward filtering phase as follows:

$$K_{s,k} = \hat{P}_k A_k^T \check{P}_{k-1}^{-1}$$

$$\hat{x}_{s,k} = \hat{x}_k + K_{s,k}(\hat{x}_{s,k+1} - \check{x}_{k+1})$$

$$\hat{P}_{s,k} = \hat{P}_k - K_{s,k}(\check{P}_{k+1} - \hat{P}_{s,k+1})K_{s,k}^T$$

Here k=N−1, ..., 0, where $K_{s,k}$ is the smoother gain, and $\hat{x}_{s,k}$ and $\hat{P}_{s,k}$ are the smoothed estimate and associated covariance matrix, respectively. Smoother estimate and covariance variables are initialized at $\hat{x}_{s,k} = \hat{x}_k$ and and $\hat{P}_{s,k} = \hat{P}_k$ at k=N.

An experimental sink polar for the UAV was calculated from flight data and is shown along with the DATCOM sink polar in FIG. 1.

The second-order polynomial fit, to be used for in-flight estimation of sink, is a function of airspeed, and is given by (5):

$$v_s(V_a) a_s V_a^2 + b_s V_a + c_s$$

where $a_s$, $b_s$, and $c_s$ are the polynomial coefficients (shown in Table II).

As can be seen in the figure, the two sink polars of the UAV compare well, specifically when looking at the change in sink rate as airspeed changes. The difference in magnitude, which amounts to a downward shift of the experimental sink polar, highlights the increased drag produced in reality, which DATCOM underestimates in its aerodynamic analysis. Nevertheless, the DATCOM sink polar predicts the same minimum sink airspeed (at the tangent to the top of the sink polar curve), which can be used to maximize flight time. The difference in magnitude would amount to overestimating netto-variometer measurements, which will therefore require a higher threshold when looking for thermals.

The UAG generally operates in two phases: gliding or powered flight. In the glide phase the ESC actively applies a break on the motor to prevent the propeller from free-wheeling, and thus allowing he UAG to enter into a steady descent, with the elevator controlling airspeed through pitch. Conversely, in powered flight, the flight controller commands both throttle and pitch in order to either ascend and gain altitude or maintain a desired altitude at a desired airspeed. Since the UAG's aerodynamic design allows it to capitalize on available atmospheric lift, a beneficial functionality to have during powered flight is to be capable of identifying thermals while thrust is being generated. To do so, an accurate thrust model is needed to properly account for the energy added to the system due to thrust in netto-variometer estimation.

An estimate of the specific energy rate added to the system due to the thruster unit is needed in order to account for the increase in total energy under powered flight conditions. Without this estimate, netto-variometer data would falsely identify thermals where none exist. It is modeled as (6):

$$\dot{e}_t = \frac{V_a T}{mg}$$

where T is the axial thrust force from the motor. Here, airspeed is obtained from the EKF estimation process running on the flight controller using sensor data from an airspeed sensor and pitot tube. Thrust estimation, however, is calculated indirectly with (7):

$$T = \rho n^2 D^4 C_T$$

where n is angular velocity, D is propeller diameter, and $C_T$ is the coefficient of thrust. An off-the-shelf autopilot can provide estimates of the air density based on measurements from the airspeed sensor and barometer. RPM measurements are obtained from the ESC, which measures the back-emf voltage from the motor to estimate its angular velocity. This leaves $C_T$ to be the only variable unaccounted for. It can be experimentally related to the advance ratio, which is a ratio of the air velocity to the propeller tip velocity (8):

$$J = \frac{V_a}{nD}$$

The relationship between CT and J was collected through wind tunnel experiments (9). We fitted a second order polynomial for the folding propeller 13×6.5 Aero-Naut (FIG. 2):

$$C_T = a_J J^2 + b_J J + c_J$$

Figure 2:
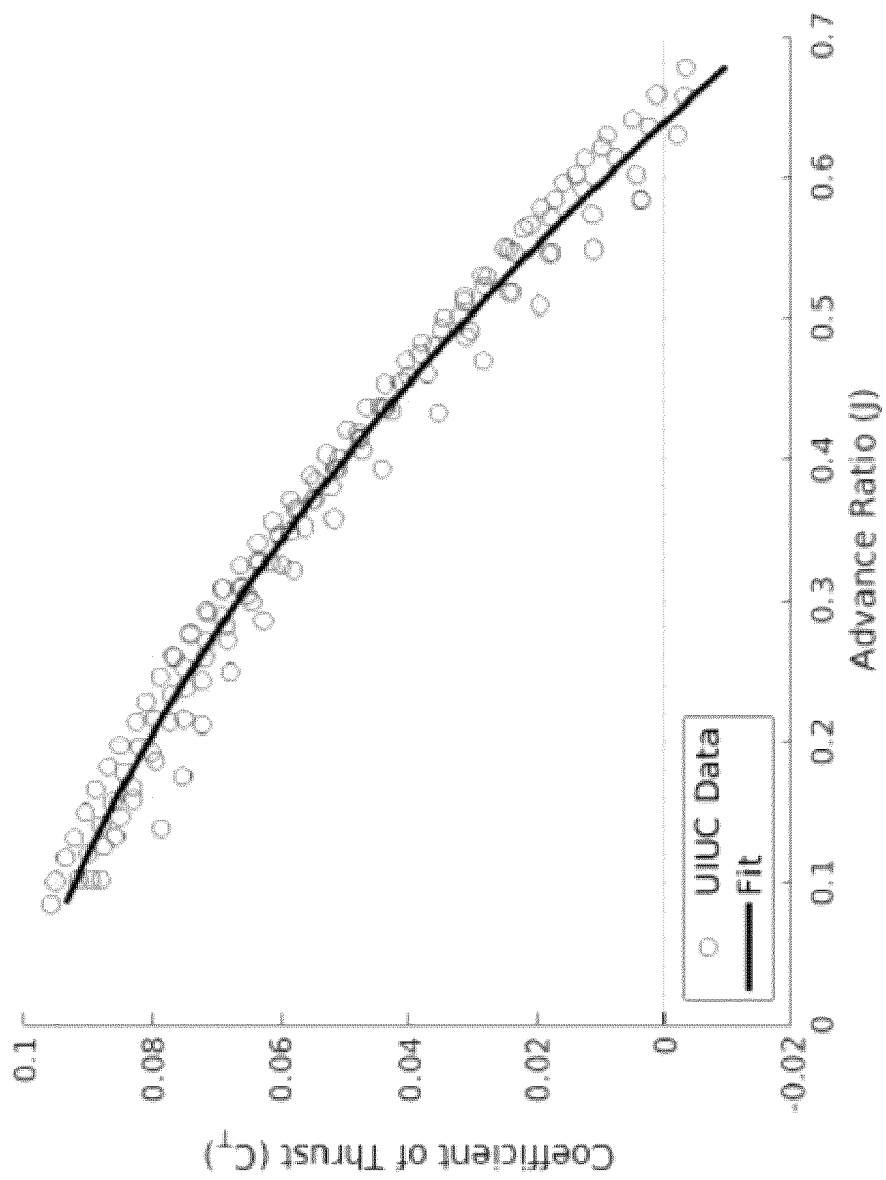
FIG. 2 is a chart showing the coefficient of thrust versus advance ratio.

FIG. 2 provides the coefficient of thrust versus advance ratio for the Aero-Naut CAM 13×6.5 folding propeller. The above developed algorithms were programmed on using an existing autopilot flight stack and preliminary tests were performed in a simulator environment. By running the same code which will be eventually flashed on the flight controller for experimental testing, the software simulation setup serves as a powerful tool to evaluate the performance of the UAG in a controlled environment as well as debug the code.

An overview of thermal detection, using netto-variometer measurements, is presented here. Furthermore, thermal centering control is adapted from previous works to guide the UAG towards an orbit about the point of maximum updraft within the thermal.

Using sink and thrust specific energy estimates developed in the previous sections, netto-variometer measurements are reproduced in-flight using (10):

$$v = \dot{h} + \frac{V_a \dot{V}_a}{g} - \dot{e}_t - v_{s_\phi}$$

where h is the rate of change in altitude, representing the rate of change of specific potential energy, and is the rate of change of specific kinetic energy. $v_{s\phi}$ is the natural sink rate, obtained from the polynomial fit to the sink polar as discussed in Section II, modified to account for added sink during a bank, as follows (11):

$$V_{a\phi} = V_a \sec(\phi)^{0.5}$$

$$v_{s\phi} = v_s(V_{a\phi}) \sec(\phi)^{1.5}$$

where $\phi$ is the roll angle.

During flight, output from (10) is monitored through a moving window average, in order to filter sensor noise and atmospheric disturbances due to wind gusts or during short phases of accelerated flight. A minimum threshold of filtered netto-variometer is used to determine if the UAG should latch.

If the updraft velocity is deemed sufficient to begin thermalling, the UAG will enter an orbit about the initial location of thermal detection. To locate the point of maximum updraft within a thermal, the centroid method developed in is employed. The centroid is computed as follows (12):

$$x_c = \frac{\sum_{k=1}^{N} x_k c_k^2}{\sum_{k=1}^{N} c_k^2} + \omega_c \sum_{k=1}^{N} w_{n_k} T_s$$

$$y_c = \frac{\sum_{k=1}^{N} y_k c_k^2}{\sum_{k=1}^{N} c_k^2} + \omega_c \sum_{k=1}^{N} w_{n_k} T_s$$

where $v_k$ is the $k^{th}$ netto-variometer measurement, as per (10), $x_k$, and $y_k$ are the inertial positions along the North and East axes, respectively, and $x_c$ and $y_c$ are the centroid positions in the inertial frame. Since thermals tend to shift or lean downwind as they are continuously pushed by wind in the horizontal plane, wind estimates are introduced (12). $w_{nk}$ and $w_{ek}$ are the inertial wind estimates along the North and East axes, respectively, $T_s$ is sampling rate, and $w_c$ is a weighing parameter, introduced to weigh the wind compensation applied to the estimates, and is tuned empirically during testing depending on the conditions in the field.

This method uses a batch of N data samples collected during the orbital phase of flight when thermalling. The batches of data are built during flight using a moving window in a first-in-first-out manner.

Preliminary tests were performed in a software simulation environment, using an autopilot system of the aircraft. By running the same code which will be eventually flashed on the Pixhawk flight controller for experimental testing, Software simulation testing serves as a powerful tool to evaluate the performance of the developed algorithms in a controlled environment as well as debug the developed code.

The two main components of the Software simulation are the autopilot flight stack and the Gazebo simulator. The autopilot flight stack runs the control and estimation code which integrates the default autopilot code with the thermalling algorithms, while the Gazebo simulator runs a model of the UAG along with on-board sensors and the motor. Through a MAVLink interface, Gazebo sends artificial sensor measurements to autopilot, which in turn estimates the states of the aircraft, and computes control commands in the form of surface deflections and motor throttle command, which are in turn sent to the Gazebo simulation.

The UAG model is based on the built-in Gazebo six degree of freedom rigid body dynamics. The forces and moments governing the dynamics of the body include the force due to gravity, the motor thrust force and moment, and the aerodynamic forces and moments. The aerodynamic forces and moments of the glider, the platform used in this work, are defined as (13):

$$F_{aero}[-QSC_D, QSC_Y, -QSC_L]^T$$

$$M_{aero} = [QSvC_l, QScC_m, QSvC_n]$$

where $Q = \frac{1}{2}\rho V_a^2$ is the dynamic pressure, b is the wingspan, c is the mean aerodynamic chord. $C_D$, $C_Y$, $C_L$ are the total drag, side-force, and lift coefficients, respectively, and $C_l$, $C_m$, $C_n$ are the total roll, pitch, and yaw moments coefficients, respectively. The aerodynamic coefficients were obtained from the DATCOM analysis.

The motor model in Gazebo was modified to reflect the motor used on the UAG, and thus be more representative of the behavior of the true behavior of the UAG. The thruster unit for the UAG comprises a T-motor AT2321 950KV brushless DC motor, a 13×6.5 Aero-Naut folding propeller, and a Kotleta20 Electronic Speed Controller (ESC).

Simulations were performed to demonstrate the ability to latch onto thermal updraft in all phases of flight, powered climb, glide, or powered level flight, and the added efficiency acquired from utilizing atmospheric energy. A simple mission was designed to perform a square pattern with a total defined distance of 2400 m. Three separate ideal thermal updrafts were distributed around the map such that the UAG would encounter each thermal during a different phase of flight. Thermals were modeled using a Gaussian distribution of Up/Down wind, with sink surrounding the region of updraft. The first thermal was encountered during a powered climb, at the beginning of the simulation, the second during a steady glide, and the third during powered level flight. The flight envelope was restricted to an altitude ceiling of 235 m and a hold altitude of 200 m.

By introducing the ability to utilize available thermal updraft during powered phases of flight, the UAG is able to continue its mission without relying solely on the motor and preserve on-board battery capacity, allowing it to ultimately extend flight time, if desired.

To compare the improvement in efficiency, two flights were performed, the first in which the UAG was allowed to utilize available atmospheric energy, and the second in which the UAG did not use the updrafts and instead relied on the motor throughout the flight. It is assumed that the on-board battery pack is a 3S1P (3 cell) lithium polymer battery with a total pack voltage of 11.1 V and total capacity of 2.2 Ah. Therefore, the total on-board battery energy is 87.9 KJ, or a specific energy of about 6700 m. Assuming energy dissipation solely due to the motor, change in onboard energy during flight is obtained using (14):

$$\dot{e}_b = -\frac{TV_a}{mg\eta_{em}\eta_p}$$

where $\eta_{em} = \eta_{sc}\eta_m$ is the energy conversion efficiency from the battery, through the ESC, to the motor, and $\eta_p$ is the energy conversion efficiency of the propeller.

Figure 4:
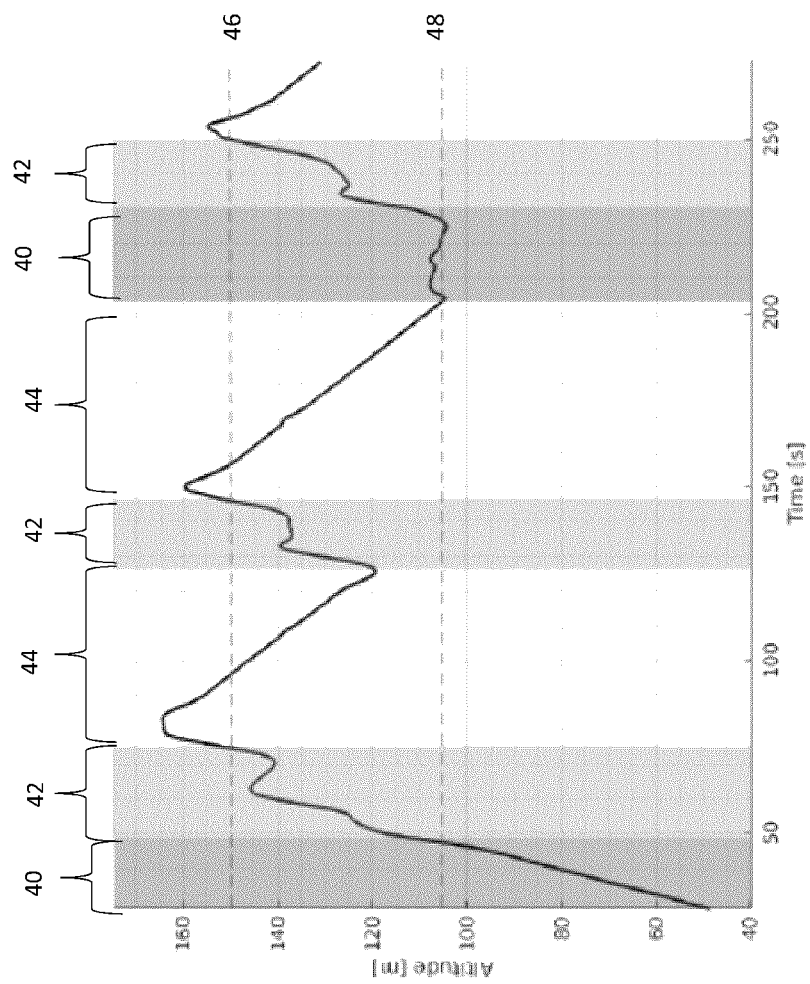
FIG. 4 is a chart showing the unmanned aerial glider altitude profile in a simulation.

Results from the first flight are shown here. FIG. 4 shows the altitude of the UAG for the entire mission. Region 40 represents powered flight, region 42 represents thermalling flight, and region 44 represents gliding flight. The upper 46 and lower 48 horizontal lines represent the thermalling cutoff and cruise altitude, respectively. The upper horizontal line 46 represents the ceiling altitude at which the UAG unlatches from the thermal and returns to the mission objective, while the lower line 48 represents steady flight altitude at which the UAG enters powered flight. The figure shows that throughout the flight, by capitalizing on available thermals, the aircraft was able to its mission while using the motor for a total of about 75 s, relying mostly on available atmospheric energy.

Figure 5:
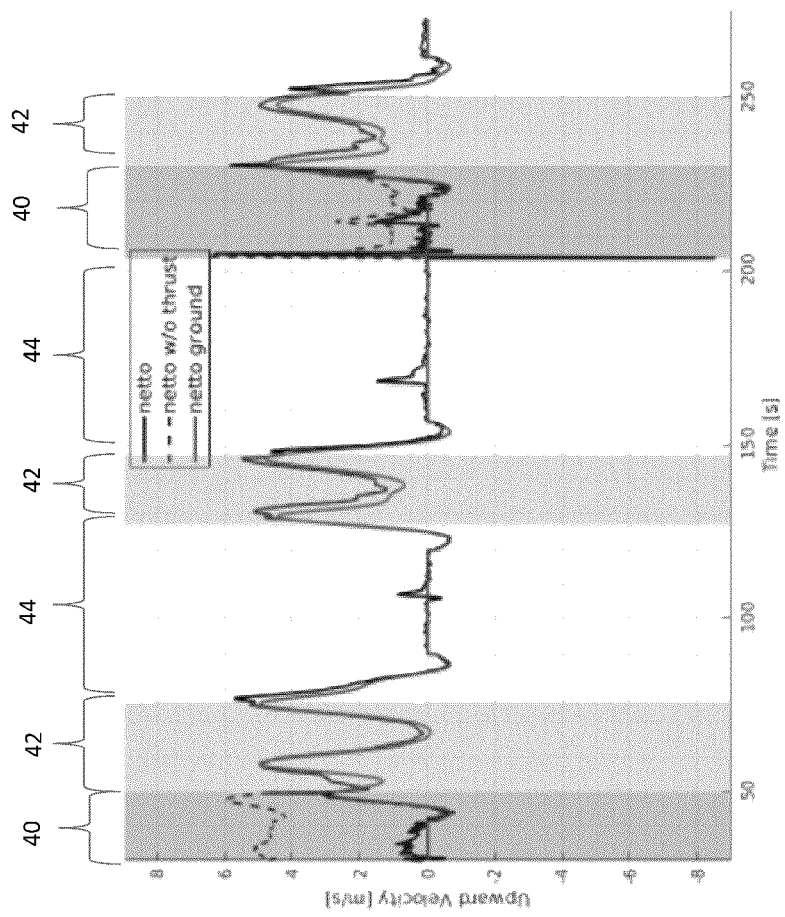
FIG. 5 is a chart showing the netto-variometer data from the simulation.

Netto-variometer measurements during the first flight are likewise shown in FIG. 5. As can be seen in the figure, calculated netto-variometer data (shown with a dotted line) remains close to the ground-truth netto measurement (shown with a light gray line) with certain spikes or deviations from the ground-truth when the vehicle is transitioning between flight phases or during accelerated flight (such as entering or exiting an orbit). These spikes do not trigger the thermalling algorithm since they are filtered by the moving average, as discussed in Section IV. If netto-variometer measurements were to be collected without accounting for the energy added to the system by the motor during powered flight, netto-variometer data would look as shown by the dashed line, which conceals the influence of thermal updraft on the UAG.

Figure 6:
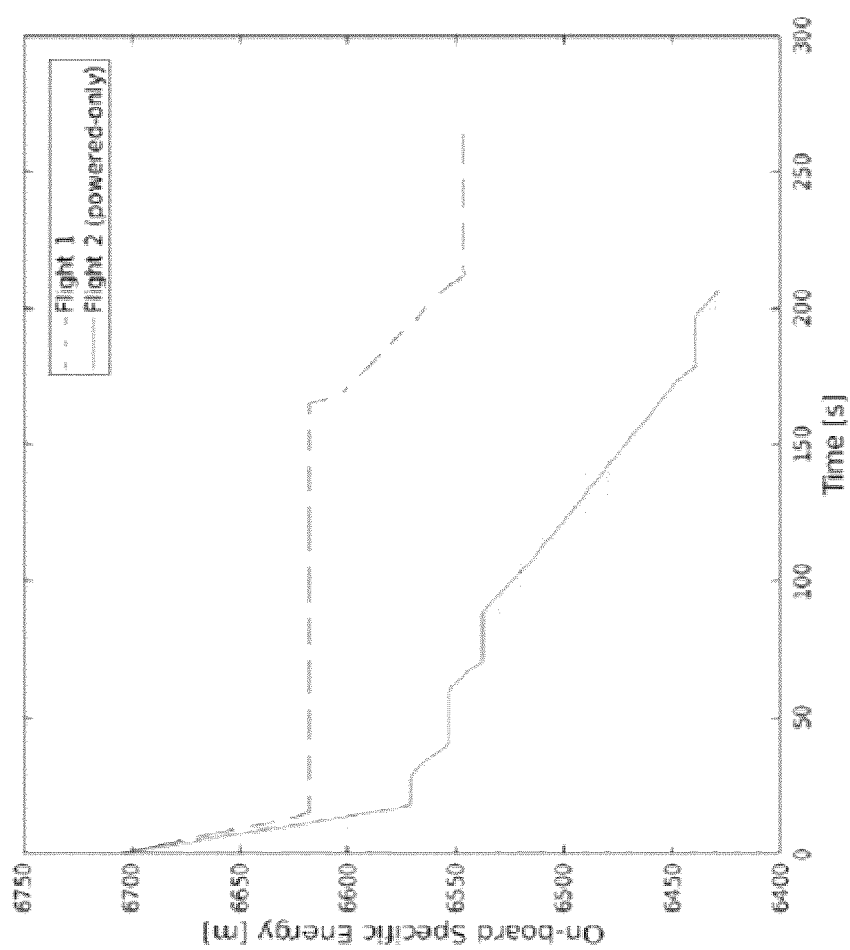
FIG. 6 is a chart showing the on-board specific energy during flight tests.

By comparing the total change in on-board specific energy, shown in FIG. 6, it is clear that the improvement in overall efficiency significantly impacts battery usage during flight. FIG. 6 provides a chart showing the on-board specific energy during flight tests. Flight 1 (shown in dotted line) shows the on-board specific energy in which thermalling algorithms were enabled; and Flight 2 (shown in a solid line) shows the on-board specific energy in which the mission was performed in powered mode.

On-board specific energy at the end of the first simulation, in which the UAG utilized available atmospheric energy, was 6550 m, while at on-board specific energy at the end of second simulation was at 6425 m. Therefore, by using the presented algorithms to detect and use thermal updrafts during all phases of flight, overall efficiency is improved, allowing the UAG to remain in flight for longer periods of time to perform other tasks or prolong the mission.

This work presents the implementation of a thermalling algorithm which allows the UAG to capitalize on any thermal updraft present during various phases of flight; powered climbing flight, powered level flight, or gliding flight. To do so, the energy added to the system due to the on-board motor is accounted for in the calculation of the change in energy, which is monitored for the effects of thermal updraft. To compute energy due to the motor, the propeller of choice is characterized in order to estimate the amount of thrust generated. Furthermore, sink polar generation is improved by using the Rauch-Tung-Striebel smoother to filter flight data and estimate the UAG's sink characteristics as a function of airspeed. In the absence of flight data required for sink polar estimation, a sink polar generated through aerodynamic analysis using digital DATCOM can be used and is shown here to provide an adequate estimate of sink. Software-in-the-Loop simulations are performed to assess the performance of the algorithm, and results show that by monitoring netto-variometer data in all phases of flight, overall flight efficiency is significantly improved as battery consumption is reduced.

The two main components of the Software simulation are the autopilot flight stack and the gazebo simulator. The autopilot flight stack runs the control and estimation code which integrates the default autopilot code with our developed algorithms. The autopilot code communicates the current state of the vehicle to the Gazebo simulator, which runs a model of the UAG and the motor.

Figure 3:
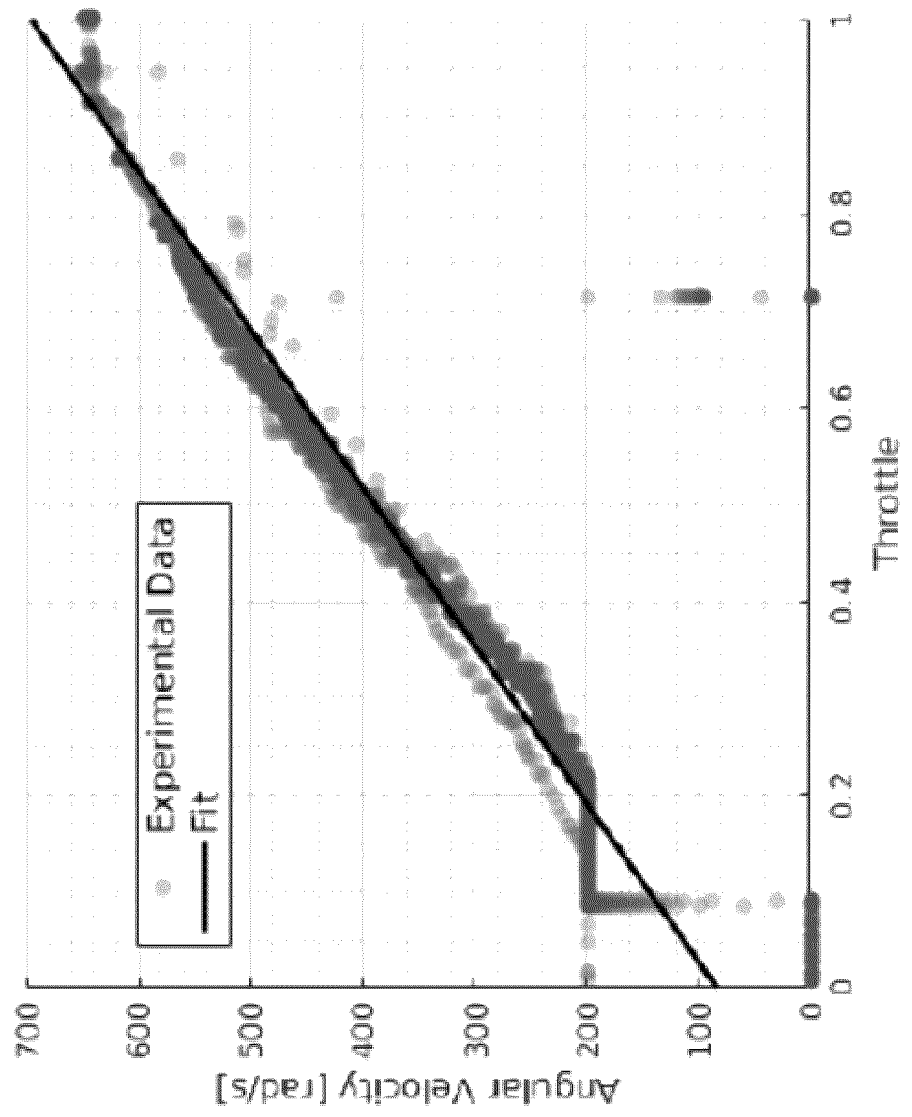
FIG. 3 is a chart showing the relationship between angular velocity and the throttle.

The UAG model is based on the built-in 6 degree of freedom rigid body dynamics, along with the aerodynamics of the glider, which were obtained from DATCOM. The motor model in Gazebo was improved to reflect the motor used on the UAG. The thruster unit for the UAG comprises a T-motor AT2321 KV950 (brushless DC), a 13×6.5 Aero-Naut folding propeller, and an Electronic Speed Controller (ESC). The ESC controls the angular velocity of the motor by varying the applied voltage as a function of commanded Pulse Width Modulation (PWM) signal, which ranges between 1000 and 2000 μs. Experiments were conducted with the RCBenchmark Series 1580 thrust stand to model the relationship between the motor's angular velocity and PWM signal, as shown in FIG. 3:

$$\omega = a_u u + b_u$$

where $a_u$, $b_u$ are the fitted parameters (Table I). We modeled it to improve the thrust characteristics in the Gazebo simulator, and scaled the PWM signal to [0,1] as required by the autopilot flight stack.

TABLE I

Coefficients used in propeller characterization.

| Parameter | Value |
| --- | --- |
| $a_u$ | 619 |
| $b_u$ | −532 |
| $a_j$ | −0.128 |
| $b_j$ | −0.077 |
| $c_j$ | −0.101 |

A simulation was performed to demonstrate the ability to latch onto thermal updraft in either phase of flight, powered or glide. Three thermal updrafts were distributed around the map such that the UAG would encounter each thermal in a different phase of flight. The first thermal was encountered during a powered climb, at the beginning of the simulation. The second thermal was encountered during a steady glide. The third and last thermal was encountered during steady powered flight. By introducing the ability to utilize available thermal updraft during powered phases of flight, the UAG is able to continue its mission without relying on the motor and preserve the battery, ultimately extending flight time.

FIG. 4 shows the altitude of the UAG for the entire mission. Region 40 represents powered flight, region 42 represents thermalling flight, and region 44 represents gliding flight. The lower 48 and upper 46 horizontal lines represent the steady flight altitude, at which the UAG entered powered flight, and the thermalling cut-off altitude, respectively. The figure shows that throughout the flight, by capitalizing on available thermals, the aircraft was able to complete the mission with only using the motor for a total of about 75 seconds, relying mostly on available updraft.

Netto-variometer measurements during flight are shown in FIG. 5. As can be seen in the figure, netto-variometer data (shown with a bold black line) remains close to the ground-truth netto measurement (shown with a light gray line), with certain spikes between phases during transition. These spikes do not trigger the thermalling algorithm since they are filtered out by a moving average. If netto-variometer measurements were to be collected without accounting for the energy added to the system by the motor during powered flight, netto-variometer data would look as shown by the dashed line, in which it would be impossible to detect the presence of a thermal.

Therefore, by using the algorithms discussed in the previous section, the UAG is able to detect and latch onto thermals while in powered flight.

Figure 7:
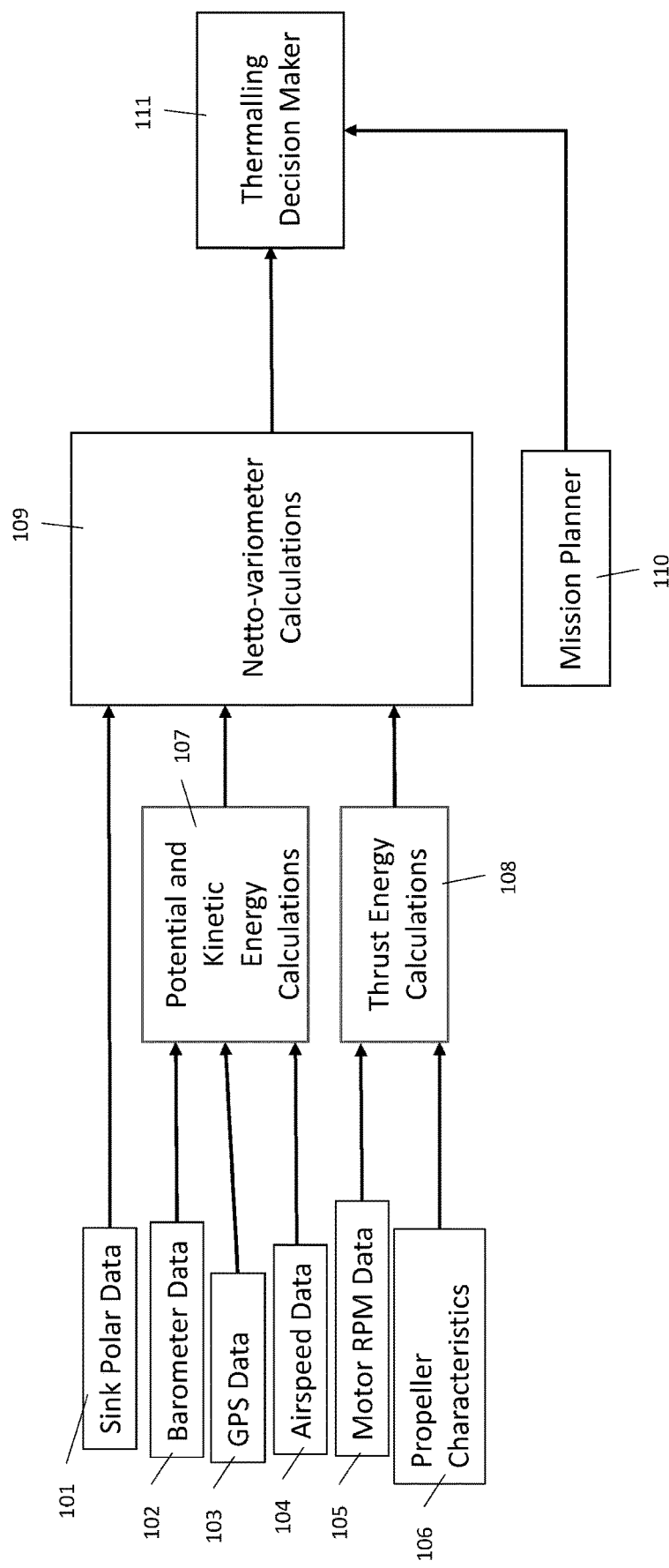
FIG. 7 is a block diagram of an embodiment of the instant invention.

FIG. 7 shows a block diagram of an embodiment of the instant invention. In this embodiment, data such as the sink polar data 101, barometer data 102, GPS data 103, airspeed data 104, motor RPM data 105 and the propellor characteristics 106, are used for calculations 107, 108 and 109 to output a decision regarding the thermalling 111 and subsequent mission planning 110. The calculations 107, 108 and 109 that may be conducted include: potential energy calculations 107, kinetic energy calculations 107, thrust energy calculations 108. The calculations 107 and 108 can then be used as inputs for the netto-variometer calculations 109.

Figure 8:
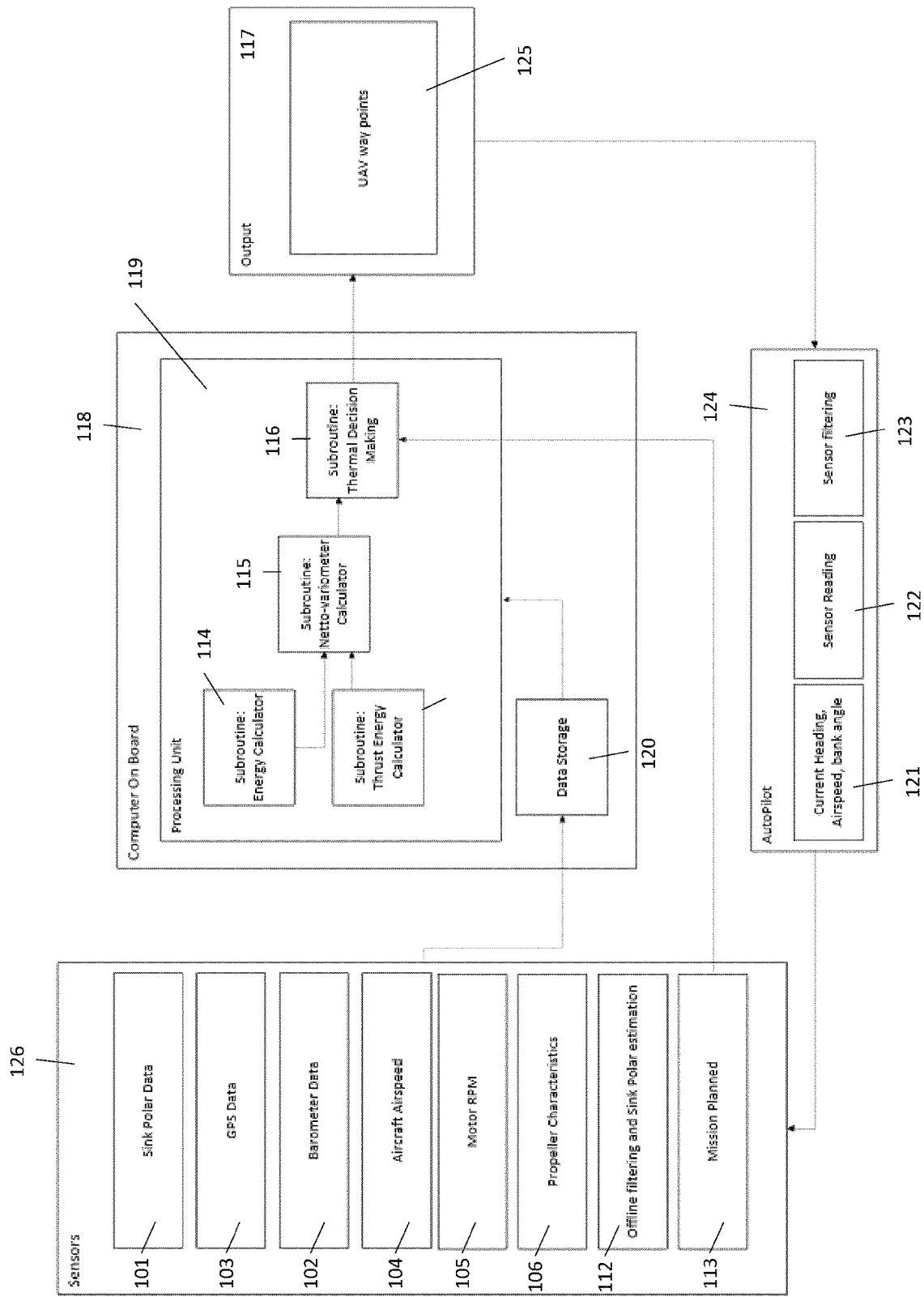
FIG. 8 is a block diagram of another embodiment of the instant invention.

FIG. 8 shows block diagram of another embodiment of the instant invention. In this embodiment, the autonomous aerial vehicle data can be collected using autopilot 124 comprising at least one of sink polar data 101, GPS data 103, Barometer data 102, aircraft speed 104, motor RPM 105, sensors 126, and propeller characteristics 106. The autopilot 124 may comprise information about the current heading, airspeed, and bank angle 121, a sensor reading 122 and sensor filtering 123. In one embodiment, the live flight data can use data acquired from the sensors 126.

A computer implemented method of acquiring and processing autonomous aerial vehicle data is taught. The on-board computer 118 can obtain past flight data from an autonomous aerial vehicle; store the data in a database 120; and conduct netto-variometer calculations 115 to obtain equations to normalize the data. This may be done using a filtering technique to normalize the data; storing the equations obtained from the netto-variometer calculations into the database; and using the stored equations and live flight data to generate an optimized sink polar estimate for the UAG, wherein the optimized sink polar estimate is to be used in computing netto-variometer during flight.

Calculations may be conducted on a processing unit 119, located on a computer on-board 118 the UAV. The calculations may include energy calculations 114 (including potential and kinetic energy calculations); and thrust energy calculations 117, which can be used as outputs for netto-variometer calculations 115 to output a decision regarding the thermalling 116 and subsequent mission planning/UAV way-point finding 125.

In another embodiment, a system for acquiring and processing autonomous aerial vehicle data is taught. The system may comprise an aerial vehicle; a computer 118 comprising a database 120 and a processing unit 119 located on the aerial vehicle; and a plurality of sensors 126 for acquiring autonomous aerial vehicle data. The processing unit 119 may be responsible for energy calculations, thrust calculations 117, netto-variometer calculations 115; and thermal decision calculations 116.

Figure 9:
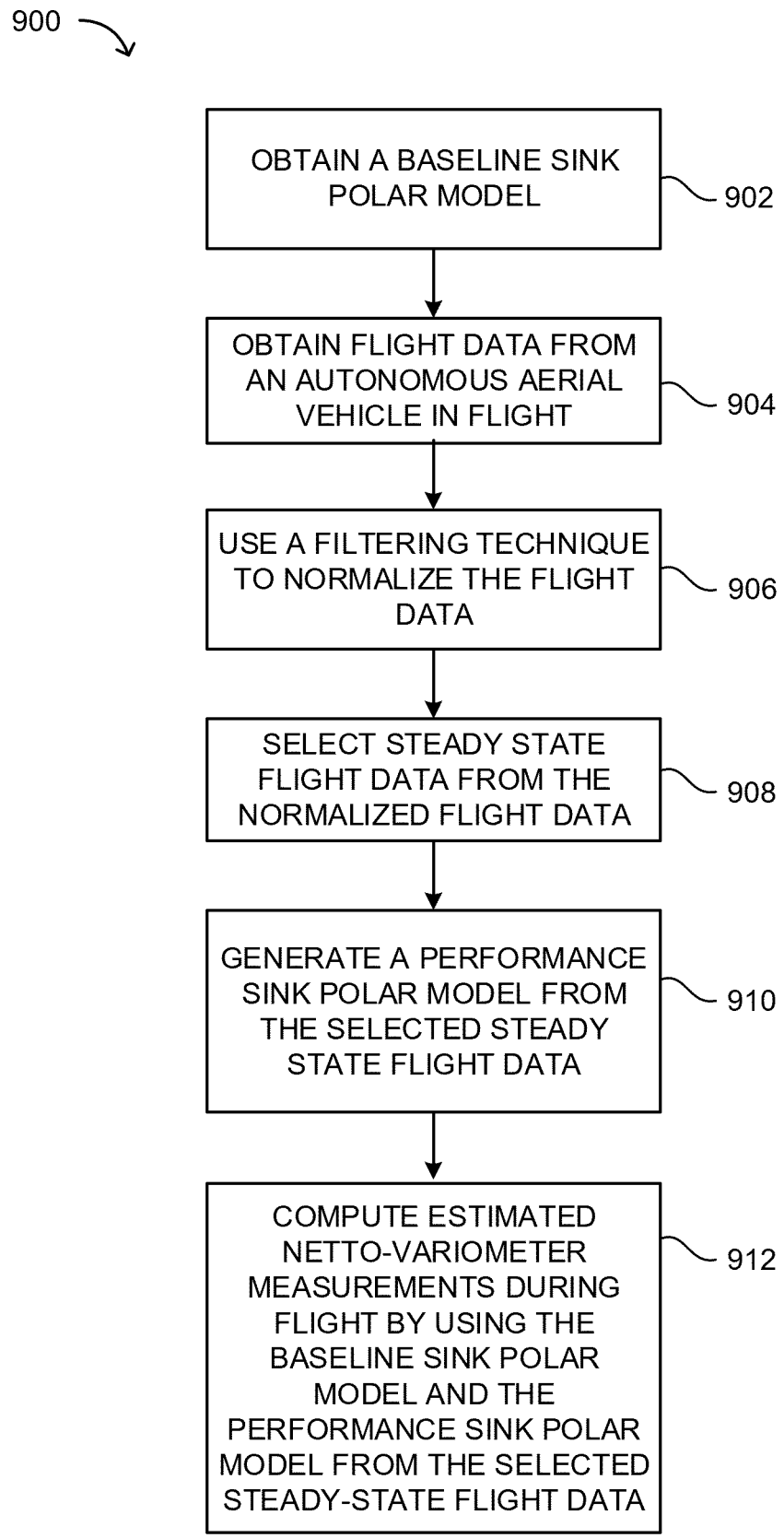
FIG. 9 is a flowchart of an embodiment of the instant invention.

FIG. 9 shows a flowchart of an embodiment of the instant invention. Method 900 comprises steps 902, 904, 906, 908, 910, and 912 as shown.

Figure 10:
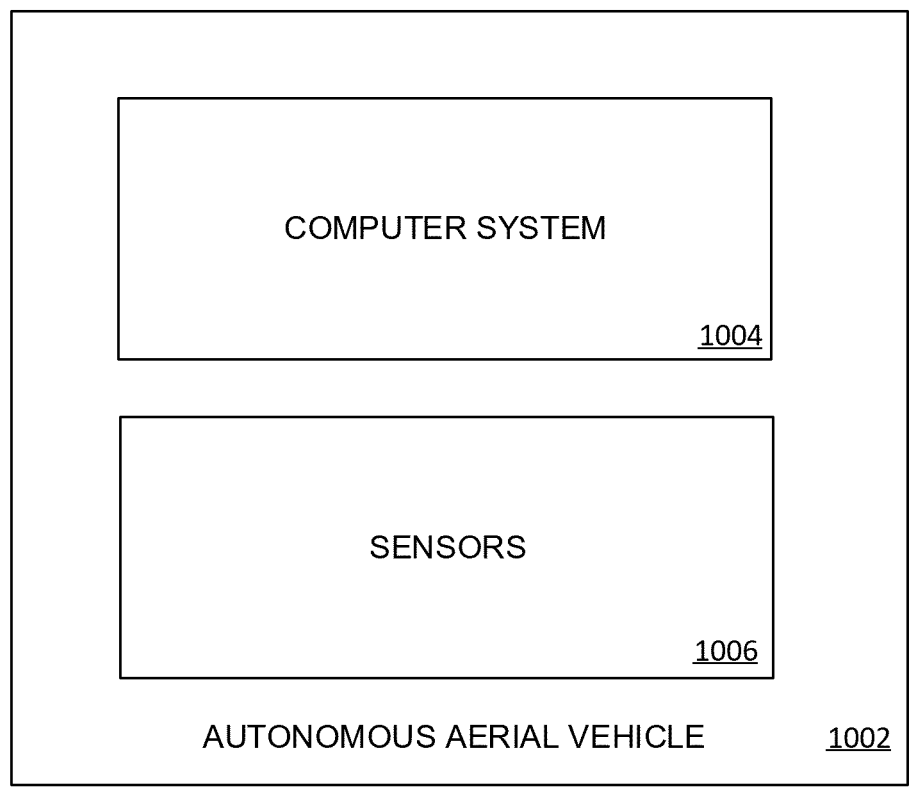
FIG. 10 is a block diagram of another embodiment of the instant invention.

FIG. 10 shows a block diagram of another embodiment of the instant invention. System 1000 comprises an autonomous aerial vehicle 1002 comprising a computing system 1002 and sensors 1004.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures, and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the platform, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of acquiring and processing autonomous aerial vehicle data to estimate netto-variometer measurement comprising:
   obtaining a baseline sink polar model;
   obtaining flight data from an autonomous aerial vehicle in flight;
   using a filtering technique to normalize the flight data;
   selecting steady-state flight data from the normalized flight data; generating a performance sink polar model from the selected steady-state flight data; and
   computing estimated netto-variometer measurements during flight by using the baseline sink polar model and the performance sink polar model from the selected steady-state flight data,
   wherein generating a performance sink polar model from the selected steady-state flight data comprises fitting the selected steady-state flight data to a second-degree polynomial,
   wherein the second-degree polynomial fit is given by:

$$v_s(V_a) = a_s V_a^2 + b_s V_a + c_s$$

where $V_a$ is airspeed, and $a_s$, $b_s$ and $C_s$ are polynomial coefficients set by the fitting process.

2. The method of claim 1, wherein the flight data comprises data acquired from sensors installed in the autonomous aerial vehicle.

3. The method of claim 1, wherein the flight data comprises data acquired from sensors external to the autonomous aerial vehicle.

4. The method of claim 1, wherein obtaining a baseline sink polar model comprises performing one or more flight tests in calm conditions, at varying airspeed, to obtain baseline flight data, filtering the baseline flight data to obtain normalized baseline flight data, and generating the baseline sink polar model from the normalized baseline flight data.

5. The method of claim 1, wherein using a filtering technique to normalize the flight data comprises:
applying a forward pass filter to the flight data; and
applying a backward pass smoother to the flight data.

6. The method of claim 5, wherein the forward pass filter is an Extended Kalman Filter (EKF) filter using equations $$\check{x}_k = A_{k-1}\hat{x}_{k-1} + B_{k-1}u_{k-1}$$

$$\check{P}_k = A_{k-1}\hat{P}_{k-1}A_{k-1}^T + Q_{k-1}$$

$$K_{k,k}\check{P}_k C_k^T(C_k\check{P}_k C_k^T + R_k)^{-1}$$

$$\hat{x}_k = \check{x}_k + K_{k,k}(y_k - C_k\check{x}_k)$$

$$\hat{P}_k = \check{P}_k - K_k C_k \check{P}_k$$

where k=0, 1 ... N samples, $\hat{x}$ is a predicted state vector, x̌ is a corrected state vector, u is a control input matrix, A is a state transition matrix, B is a control input matrix, C is an observation matrix, $\hat{P}$ is a predicted covariance matrix, $\check{P}$ is a corrected covariance matrices, K is a Kalman gain matrix, Q is a process covariance matrix, and R is a measurement noise covariance matrix.

7. The method of claim 6, wherein the backward pass smoother is a Rauch-Tung-Streibel smoother using equations:

$$K_{s,k} = \hat{P}_k A_k^T \check{P}_{k-1}^{-1}$$

$$\hat{x}_{s,k} = \hat{x}_k + K_{s,k}(\hat{x}_{s,k+1} - \check{x}_{k+1})$$

$$\hat{P}_{s,k} = \hat{P}_k - K_{s,k}(\check{P}_{k+1} - \hat{P}_{s,k+1})K_{s,k}^T$$

where k=N-1, ... 0, $K_{s,k}$ is a smoother gain, $\hat{x}_{s,k}$ is a smoother estimate, and $\hat{P}_{s,k}$ is an associated covariance matrix, and smoother estimate and covariance variables are initialized at $\hat{x}_{s,k}=\hat{x}_k$ and $\hat{P}_{s,k}=\hat{P}_k$ at k=N.

8. The method of claim 5, wherein the backward pass smoother is a Rauch-Tung-Streibel smoother using equations:

$$K_{s,k} = \hat{P}_k A_k^T \check{P}_{k-1}^{-1}$$

$$\hat{x}_{s,k} = \hat{x}_k + K_{s,k}(\hat{x}_{s,k+1} - \check{x}_{k+1})$$

$$\hat{P}_{s,k} = \hat{P}_k - K_{s,k}(\check{P}_{k+1} - \hat{P}_{s,k+1})K_{s,k}^T$$

where k=N-1, ... 0, $K_{s,k}$ is a smoother gain, $\hat{x}_{s,k}$ is a smoother estimate, and $\hat{P}_{s,k}$ is an associated covariance matrix, and the smoother estimate and covariance variables are initialized at $\hat{x}_{s,k}=\hat{x}_k$ and $\hat{P}_{s,k}=\hat{P}_k$ at k=N.

9. The method of claim 1, wherein the autonomous aerial vehicle is controlled by an autopilot, where the autopilot uses as inputs the estimated netto-variometer measurements and at least one of global positioning system (GPS) data, barometer data, aircraft speed, motor rotations per minute, thrust sensor, input from sensors, and propeller characteristics.

10. The method of claim 1, wherein the performance sink polar model is generated using the equation:

$$\upsilon = \dot{h} + \frac{V_a \dot{V}_a}{g} - \dot{e}_t - \upsilon_{s_\phi}$$

where $\dot{h}$ is a rate of change of altitude, $V_a$ is airspeed, $\dot{V}_a$ is a change in airspeed, g is gravitational acceleration, $\dot{e}_t$ is an energy rate provided by a propellor and is estimated as:

$$\dot{e}_t = \frac{V_a T}{mg}$$

where m is a mass of the autonomous aerial vehicle, and T is an axial thrust force and is estimated by:

$$T = \rho n^2 D^4 C_T$$

where n is an angular velocity, D is a propellor diameter, $C_T$ is a coefficient of thrust, and $\upsilon_{s\phi}$ is determined by the equations:

$$V_{a_\phi} = V_a \sec(\phi)^{0.5}$$

$$\upsilon_{s_\phi} = \upsilon_s(V_{a_\phi})\sec(\phi)^{1.5}$$

where $\Phi$ is a roll angle, and vs is an actual sink rate of the autonomous aerial vehicle.

11. A system for acquiring and processing autonomous aerial vehicle data to estimate netto-variometer measurement comprising:
an autonomous aerial vehicle, comprising:
a computing system, and
sensors;
the computing system configured to:
obtain a baseline sink polar model;
obtain flight data about the autonomous aerial vehicle in flight from the sensors;
use a filtering technique to normalize the flight data;
select steady-state flight data from the normalized flight data;
generate a performance sink polar model from the selected steady-state flight data; and
compute estimated netto-variometer measurements during flight by using the baseline sink polar model and the performance sink polar model from the selected steady-state flight data,
wherein generating a performance sink polar model from the selected steady-state flight data comprises fitting the selected steady-state flight data to a second-degree polynomial,
wherein the second-degree polynomial fit is given by:

$$\upsilon_s(V_a) = a_s V_a^2 + b_s V_a + c_s$$

where $V_a$ is airspeed, and $a_s$, $b_s$ and $c_s$ are polynomial coefficients set by the fitting process.

12. The system of claim 11, wherein the computing system is further configured to obtain a baseline sink polar model by performing one or more flight tests in calm conditions, at varying airspeed, to obtain baseline flight data, filtering the baseline flight data to obtain normalized baseline flight data, and generating the baseline sink polar model from the normalized baseline flight data.

13. The system of claim 11, wherein the computing system is configured to use a filtering technique to normalize the flight data by:
applying a forward pass filter to the flight data; and
applying a backward pass smoother to the data.

14. The system of claim 13, wherein the forward pass filter is an Extended Kalman Filter (EKF) filter using equations $$\check{x}_k = A_{k-1}\hat{x}_{k-1} + B_{k-1}u_{k-1}$$

$$\check{P}_k = A_{k-1}\hat{P}_{k-1}A_{k-1}^T + Q_{k-1}$$

$$K_{k,k}\check{P}_k C_k^T (C_k \check{P}_k C_k^T + R_k)^{-1}$$

$$\hat{x}_k = \check{x}_k + K_{k,k}(y_k - C_k \check{x}_k)$$

$$\hat{P}_k = \check{P}_k - K_k C_k \check{P}_k$$

where k=0, 1 ... N samples, $\hat{x}$ is a predicted state vector, $\check{x}$ is a corrected state vector, u is a control input matrix, A is a state transition matrix, B is a control input matrix, C is an observation matrix, $\hat{P}$ is a predicted covariance matrix, $\check{P}$ is a corrected covariance matrices, K is a Kalman gain matrix, Q is a process covariance matrix, and R is a measurement noise covariance matrix.

15. The system of claim 14, wherein the backward pass smoother is a Rauch-Tung-Streibel smoother using equations:

$$K_{s,k} = \hat{P}_k A_k^T \check{P}_{k-1}^{-1}$$

$$\hat{x}_{s,k} = \hat{x}_k + K_{s,k}(\hat{x}_{s,k+1} - \check{x}_{k+1})$$

$$\hat{P}_{s,k} = \hat{P}_k - K_{s,k}(\check{P}_{k+1} - \hat{P}_{s,k+1})K_{s,k}^T$$

where k=N-1, ... 0, $K_{s,k}$ is a smoother gain, $\hat{x}_{s,k}$ is a smoother estimate, and $\hat{P}_{s,k}$ is an associated covariance matrix, and smoother estimate and covariance variables are initialized at $\hat{x}_{s,k} = \hat{x}_k$ and $\hat{P}_{s,k} = \hat{P}_k$ at k=N.

16. The system of claim 13, wherein the backward pass smoother is a Rauch-Tung-Streibel smoother using equations:

$$K_{s,k} = \hat{P}_k A_k^T \check{P}_{k-1}^{-1}$$

$$\hat{x}_{s,k} = \hat{x}_k + K_{s,k}(\hat{x}_{s,k+1} - \check{x}_{k+1})$$

$$\hat{P}_{s,k} = \hat{P}_k - K_{s,k}(\check{P}_{k+1} - \hat{P}_{s,k+1})K_{s,k}^T$$

where k=N-1, ... 0, $K_{s,k}$ is a smoother gain, $\hat{x}_{s,k}$ is a smoother estimate, and $\hat{P}_{s,k}$ is an associated covariance matrix, and smoother estimate and covariance variables are initialized at $\hat{x}_{s,k} = \hat{x}_k$ and $\hat{P}_{s,k} = \hat{P}_k$ at k=N.

* * * * *